Sept. 3, 1957  V. H. PAVLECKA  2,804,747
GAS TURBINE POWER PLANT WITH A SUPERSONIC CENTRIPETAL
FLOW COMPRESSOR AND A CENTRIFUGAL FLOW TURBINE
Filed March 24, 1951  12 Sheets-Sheet 1

INVENTOR.
VLADIMIR H. PAVLECKA,
BY
Nicholas T Vohr
ATTORNEY.

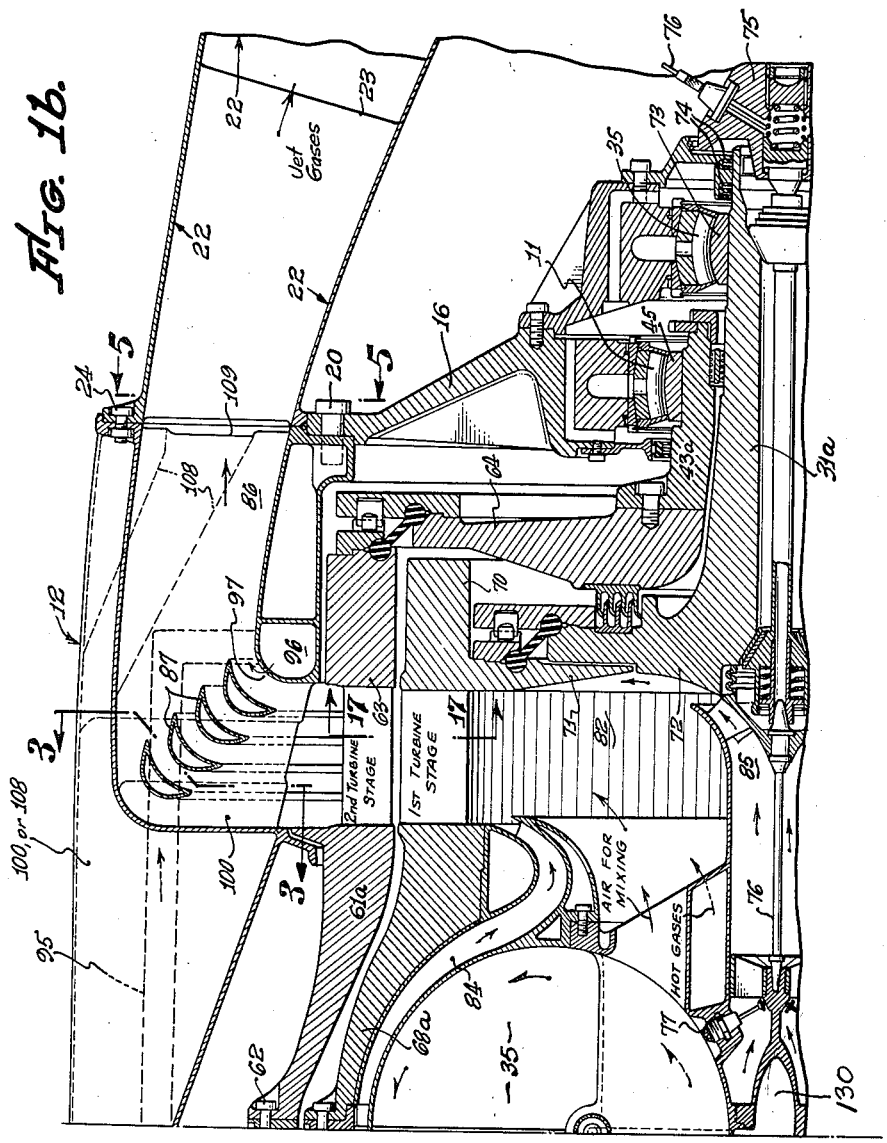

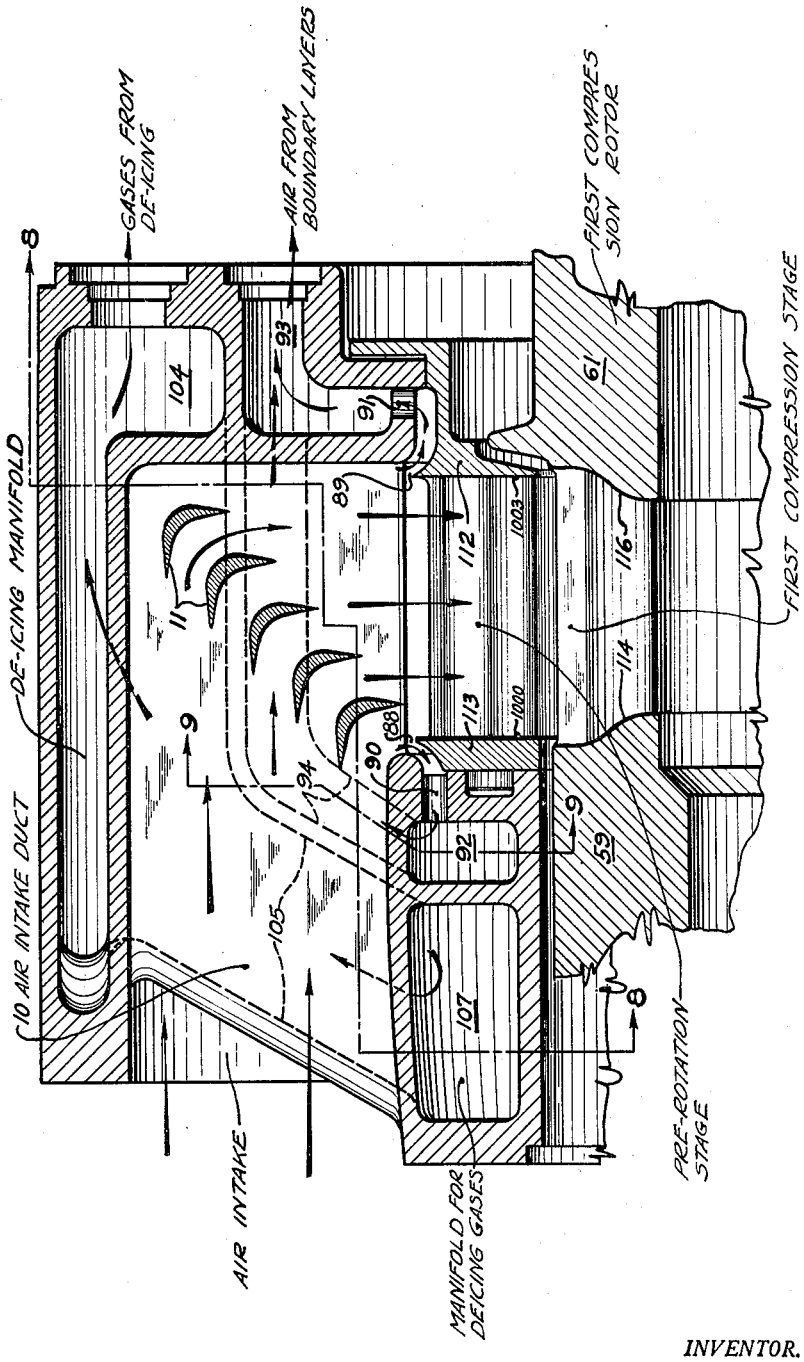

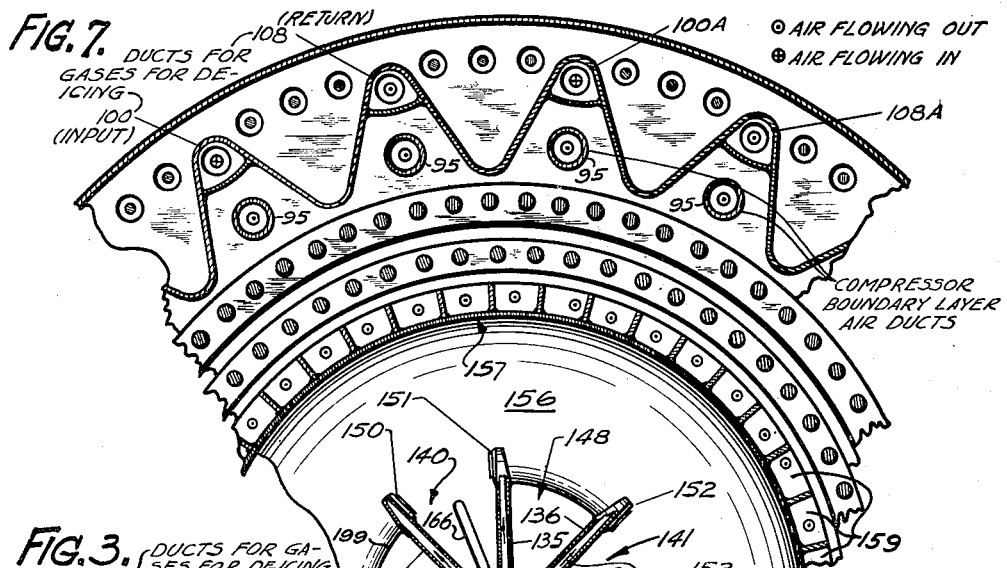

⊙ GASES FLOWING OUT
⊕ GASES FLOWING IN

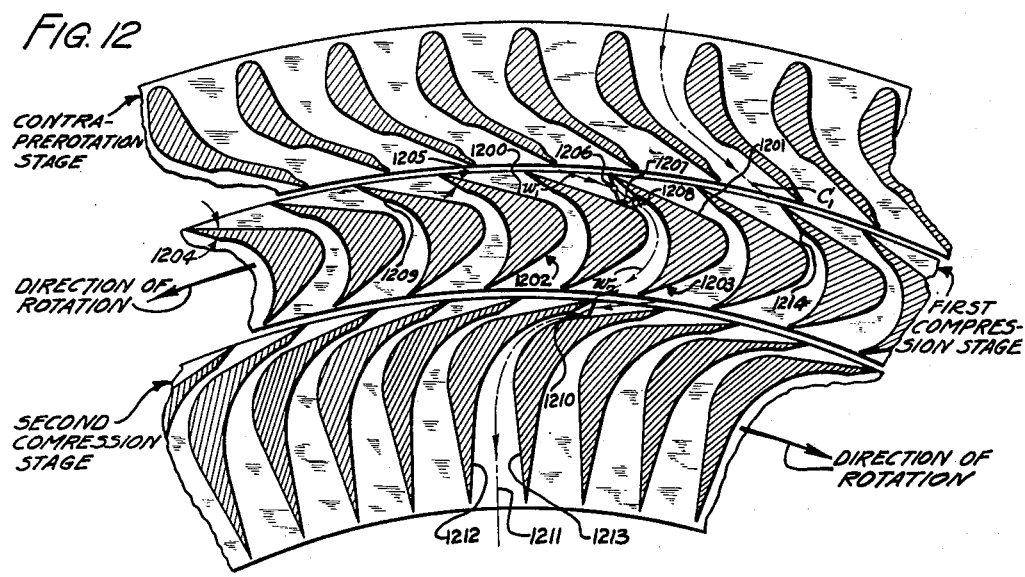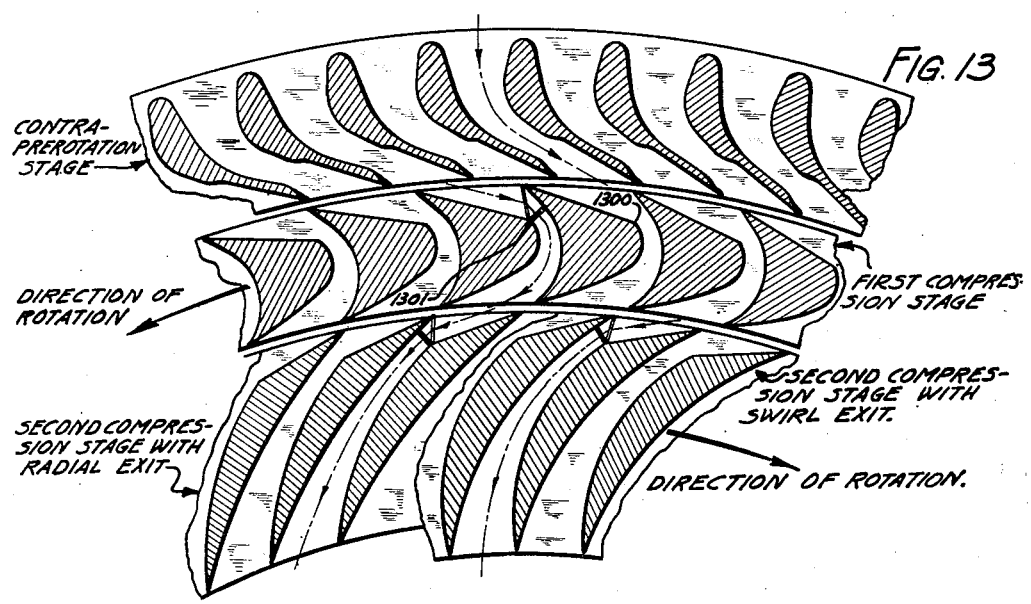

Sept. 3, 1957  V. H. PAVLECKA  2,804,747
GAS TURBINE POWER PLANT WITH A SUPERSONIC CENTRIPETAL
FLOW COMPRESSOR AND A CENTRIFUGAL FLOW TURBINE
Filed March 24, 1951  12 Sheets-Sheet 9
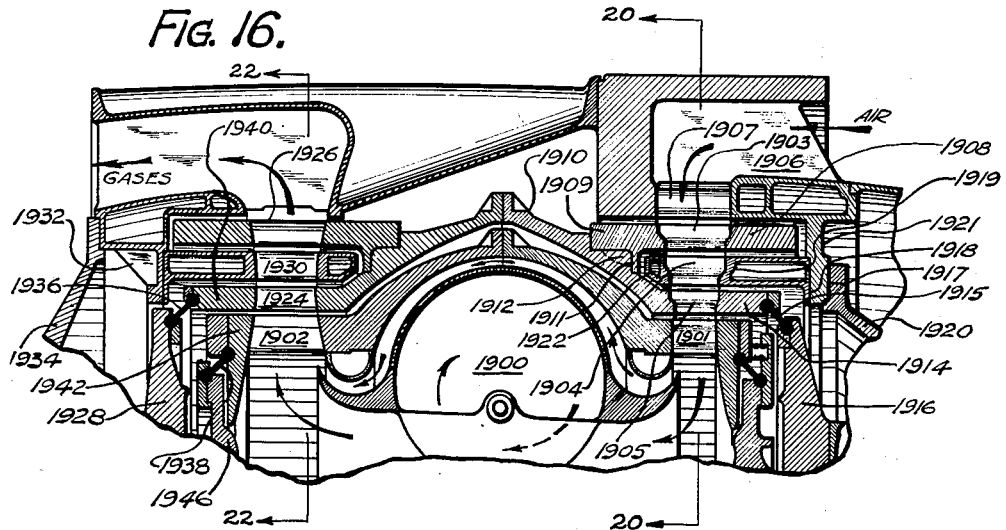
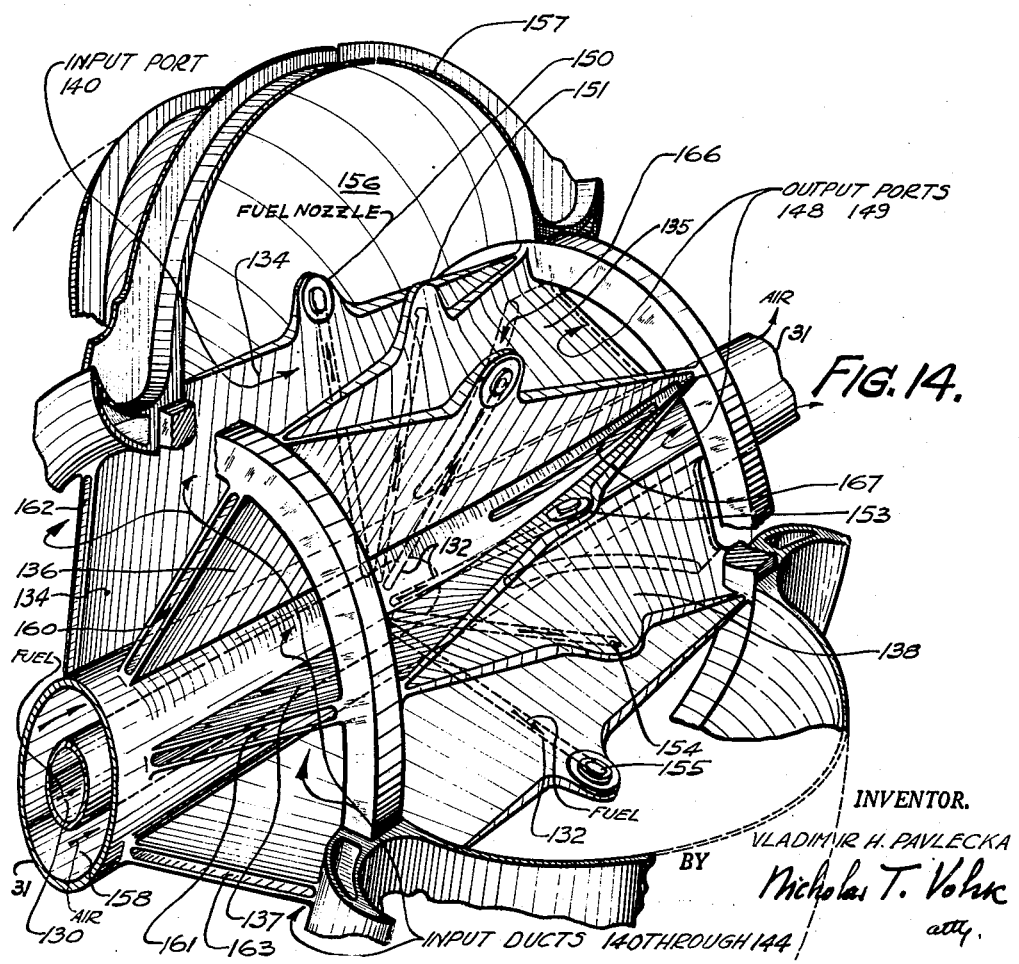
INVENTOR.
VLADIMIR H. PAVLECKA
BY Nicholas T. Volk
atty.

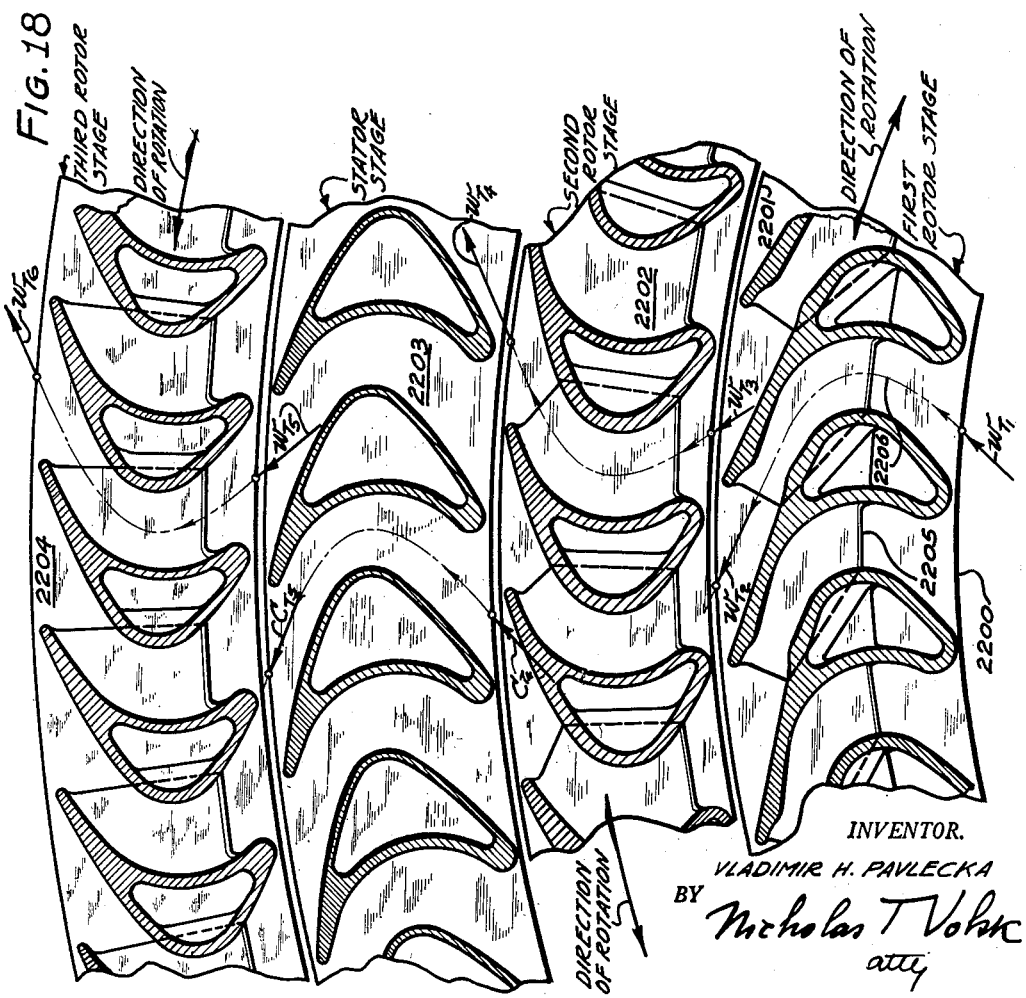

United States Patent Office 2,804,747
Patented Sept. 3, 1957

2,804,747

GAS TURBINE POWER PLANT WITH A SUPERSONIC CENTRIPETAL FLOW COMPRESSOR AND A CENTRIFUGAL FLOW TURBINE

Vladimir H. Pavlecka, Pacific Palisades, Calif.

Application March 24, 1951, Serial No. 217,347

36 Claims. (Cl. 60—39.16)

This invention relates to a gas turbine plant including a supersonic centripetal compressor, a rotating heat generator, and a radial centrifugal flow turbine.

It is an object of this invention to produce heated and compressed gases from air and fuel by means of a centripetal compression, vortex combustion and centrifugal expansion.

It is also an object of this invention to provide a novel gas turbine power plant utilizing a centripetal supersonic dynamic compressor in which compression is accomplished by means of oblique, reflected, and normal shocks singly or in any combination with each other, as well as subsequent subsonic diffusion.

Still another object of this invention is to provide a novel gas turbine power plant utilizing a centrifugal compressor having a prerotation stage and a plurality of contra-rotatable rotor stages, all stages being supersonic subsonic stages.

It is also an object of this invention to provide a gas turbine power plant utilizing a centripetal supersonic compressor having a prerotation stage, a first compression stage, a stationary turning stage, and a plurality of contra-rotatable compression stages.

Yet another object of this invention is to provide a gas turbine power plant utilizing a centripetal compressor having two contra-rotatable concentric stages mounted on the periphery of two concentric closed-end cylinders, the side-discs of the cylinders being provided with journaled shafts independently supported in bearings, the inner shaft having an axial duct for supplying fuel to the combustion heat generator through one side of the shaft, and an electric ignition bus through the other end of the same shaft.

Still another object of this invention is to provide means for synchronizing the rotation of the contra-rotatable compressor and turbine rotors for maintaining proper velocity vector relationships for compressed air flowing between the compressor stages and heated gases flowing through the turbine.

Still another object of this invention is to provide a power plant rotor structure which has a minimum or zero external thrust acting on the bearings by balancing all pressures of air and of gases within the structure.

Still another object of this invention is to provide a power plant having a combustion chamber constructed to have a stationary vortex flame mass, thus insuring stability of combustion locus and eliminating the blow-outs which are common in combustion chambers operating with the so-called "stationary flame front."

Still another object of this invention is to provide a jet propulsion power plant including a centripetal compressor, a vortex combustion chamber, and a centrifugal turbine.

Present turbo-jet power plants use the following combinations: (a) an axial, subsonic compressor, a straight through-flow combustion chamber and an axial flow turbine, (b) an axial subsonic compressor discharging into a centrifugal compressor, a canister combustion chamber, and an axial turbine. The single spool axial compressors can produce no more than 6 to 1 compression ratio at best and this compression ratio is obtainable only with very limited breathing capacity which obviously limits the maximum thrust output of the power plant. Thus, the axial compressors are very poor compressors for jet power plants for two reasons: low compression ratio and small breathing capacity. This also produces low expansion ratio in the turbine and high jet temperatures with the concomitant low thermal and propulsive efficiencies. The ruining effect produced by the axial compressors on the jet power plant, because of low compression ratio, does not end here. Because of practical considerations, there is no other alternative but to accept high exit jet velocity with the resultant low propulsive efficiency. All of these detrimental effects combine to produce very high fuel comsumption per pound of thrust per hour. The lowest present figure is of the order of 0.92 pound of fuel per pound of thrust, and a more common figure is 1.05. It is not difficult to see, then that the compressor either "makes or breaks" the engine. In the second combination, a compression ratio of 7 to 1 is obtainable which obviously does not differ materially from the 6 to 1 ratio.

The combustion chambers of the straight through-flow types use stationary flame front principle of combustion, the stability of which depends on the velocity of the air entering the combustion zone of the chamber. The maximum flame propagation velocity with liquid hydro-carbon fuels is of the order of 15 feet per second. If the air velocity entering the combustion chamber per se is higher than 15 feet per second, the flame front is moved downstream, the combustion becomes incomplete, and, in an extreme case, the flame front may cease to exist after it reaches that portion of the combustion chamber where the air velocity exceeds flame propagation velocity. Restarting of the power plant under such circumstances is possible only by descending to lower altitudes, which in some instances is an impossibility. Chambers of this type also require high degree of artificially created turbulence for mixing hot and cold gases, and this turbulence is paid for by a pressure drop of the order of 8% of the total pressure at the entry to the combustion chamber which cannot be recovered by subsequent diffusion. Although this is an unnecessarily high pressure drop, the most important disadvantage of the present-day combustion chambers is the ever-present danger of losing the flame. To avoid this loss, one must limit the operating ceiling of aircraft to lower altitudes.

The compressor and turbine blades in the axial flow machines are cantilevered blades fastened to the disc only at their root and their outer ends are free, like blades in any propeller. Such fastening of blades diminishes their ability to withstand impact-induced vibrations with the result that failure of such blades is not an uncommon occurrence. Although perhaps it is not strictly proper to charge the low thermo-dynamic efficiency to the axial turbuines proper, since it is more properly chargeable to the axial compressor, nevertheless the fact still remains that this efficiency is low because of low expansion ratio, which produces very high blade temperatures, such as 1400° F.

The disclosed power plants have a compression ratio of the order of 11 to 1 with the alloys now on the market, and it is possible to envisage compression ratio of the order of 15 to 1 with two supersonic contra-rotating stages; this compression ratio at once raises the thermodynamic efficiency of the turbine and the propulsive efficiency of the jet by lowering the exhaust jet temperature and its exit velocity. The combustion chamber uses a fixed flame position, the flame position being independent of the air flow velocity. Therefore, blowing out of flame is a practical impossibility. Moreover, there is no significant pressure drop present across the combustion heat generator and there even may be again.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only, and are not intended as a definition of the limits of the invention.

Figs. 1a and 1b are the longitudinal cross-sectional view of the jet power plant utilizing a two-stage supersonic compressor and a two-stage turbine;

Fig. 2 is an enlarged cross-sectional view of the entry duct and prerotation stage of the compressor;

Fig. 3 is a transverse cross-sectional view, taken along line 3—3, Fig. 1b, partly in perspective, of deicing ducts located at the output of the turbine;

Fig. 4 is a radial view, taken along line 4—4, Fig. 3, looking outward, of the deicing duct illustrated in Fig. 3;

Fig. 5 is a transverse view, taken along line 5—5, Fig. 1b, of the exhaust pipe and deicing ducts;

Fig. 6 is a radial view, taken along line 5—5, Fig. 5, of the deicing duct illustrated in Fig. 3;

Fig. 7 is a transverse cross-sectional view, taken along line 7—7, Fig. 1a, of the deicing ducts and of the combustion heat generator;

Figs. 11 through 13 are similar cross-sectional views of modified versions of the centripetal supersonic compressors;

Fig. 14 is a perspective view, partly in section, of the combustion heat generator;

Fig. 16 is a longitudinal cross-sectional view of the three-stage power plant;

Fig. 18 is a transverse cross-sectional view, taken along line 22—22, Fig. 16, of the three-stage supersonic-subsonic centrifugal turbine;

Figure 1A:
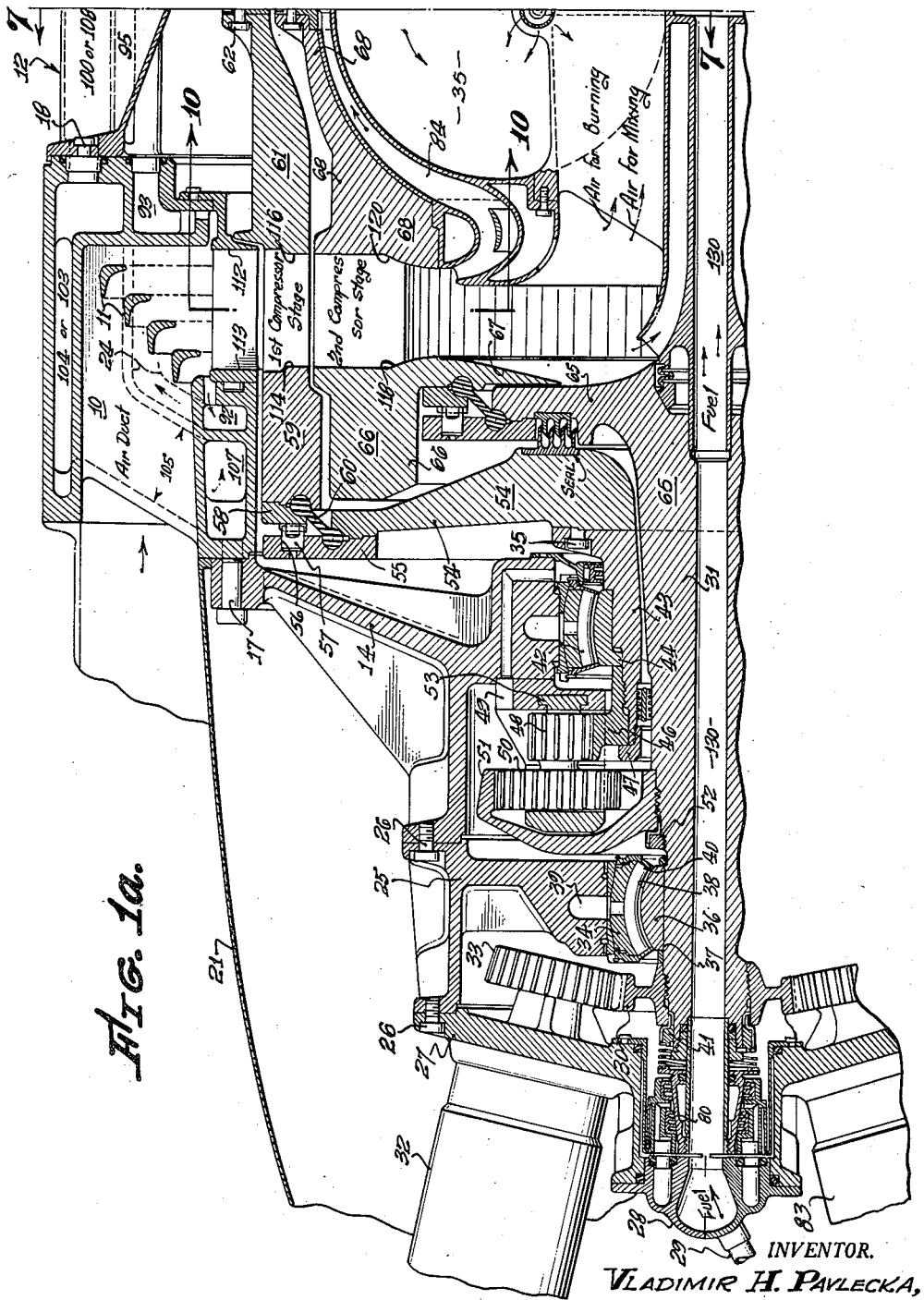
Figure 8:
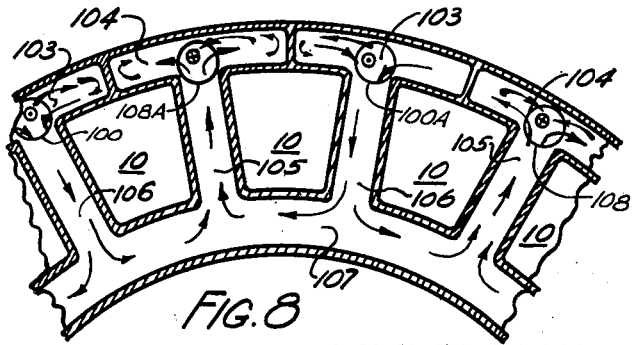
Fig. 8 is a transverse cross-sectional view, taken along line 8—8, Fig. 2, of the compressor input ducts and deicing ducts.
Figure 9:
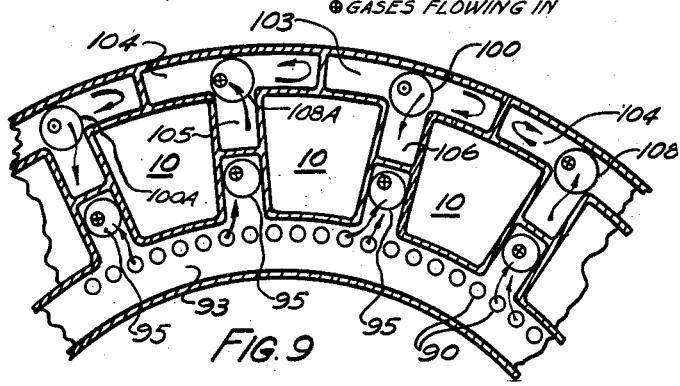
Fig. 9 is a transverse cross-sectional view, taken along line 9—9, Fig. 2, of the compressor input ducts, deicing ducts and boundary layer removing ducts.

Referring to Figs. 1a and 1b, the power plant is mounted on a composite frame consisting of an air intake duct 10, a central member 12, a front member 14, and a rear member 16, which are peripherally bolted together at 7, 18, and 20 so as to constitute a unitary frame. The front end of the plant is cowled in a front cowl 21 and the rear end terminates in a jet duct 22 provided with radial vanes 23. The duct 22 is fastened to the central member 12 of the frame at the peripheral, bolted joint 24. The front member 14 is extended forward by having a ring-shaped frame member 25 bolted to it by means of a peripheral joint 26. The ring-shaped frame member 25 is closed off by means of a slanted flat ring 27. The front end of ring 27 terminates in a fuel connector 28 which is connected through a flexible hose 29 to a fuel pump (not shown) driven by a gear 30 keyed to an inner shaft 31 which also has the rear end portion 31-a of the shaft at the rear end of the power plant. The fuel pump is not indicated in the drawing but its method of mounting and gearing to shaft 31 and gear 30 is identical to that of a generator 32 terminating in a pinion 33 geared to the driving gear 30, the latter type of connection being also used for governor. Shaft 31 is mounted in two radial-axial bearings 34 and 35, made preferably of bearing aluminum alloy. The front end bearing 34 consists of a steel ring 36, the flat inner surface 37 of which forms a sliding axial fit with shaft 31 but is keyed to the shaft to prevent its rotation around the shaft. The outer surface 38 of ring 36 has a spherical surface constituting the sliding surface for the similarly shaped sliding surface of bearing 34. The frame member 25 is provided with an oil gallery 39 connected to a source of lubricating oil, this gallery communicating with oil grooves 40 which run parallel to shaft 31. Means are also provided for sealing the entire periphery of bearing 34 on its sides to prevent excessive sideway oil leakage from the grooves 40. The position of the bearing ring 36 is fixed on shaft 31 by an end nut 41 so that the engagement of the two spherical surfaces fixes the longitudinal position of shaft 31 with respect to frame member 25. Similar bearings 42 and 11 are used for mounting shaft 43, 43-a by means of bearing rings 44 and 45, ring 44 being provided with a shoulder for longitudinal location of shaft 43. This longitudinal location is obtained through a ring gear 46 which is held in fixed position by a ring nut 47 and circumferential splines between shaft 43 and the ring gear 46. Ring gear 46 is geared to a plurality of circumferentially positioned pinions 48 which revolve around their respective shafts such as shaft 53 mounted in a ring resembling somewhat a squirrel cage solidly bolted to a frame member 14. The squirrel cage ring 49 is provided with four large openings which house four synchronizing gear assemblies including gear ring 46, pinion 48, gear 50, and a ring gear 51 provided with gear teeth on its inner surface. The ring gear 51 is splined to shaft 31 and is held in a fixed axial position by a ring nut 52 threaded to shaft 31. The synchronization of the two shafts is obtained by transmitting any differential torque between the shafts 31 and 43 through the synchronizing gears 46, 48, 50, and 51. Pinion 48 and gear 50 constitute one solid piece mounted on the same shaft 53. Since shafts 53 prevent the rotation of the synchronizing pinions 48 and 50 with the two gear rings 46 and 51 (pinions 48 and 50 revolve around pins 53 and around gears 46 and 51 respectively), the gear assembly will act as a synchronizing means between the shafts 31 and 43. The left end of shaft 43 is bolted to a side disc 54, the outer side surface of which engages a ring 55 bolted to disc 54. (The bolts are not illustrated in Fig. 1a). Ring 55 is provided with a plurality of cylindrical recesses 56 which house a corresponding plurality of cylindrical pins 57 forming a sliding fit with the cylindrical recesses. The opposite ends of the pins 57 form radially sliding fits with the corresponding radial slots in a ring 58, the entire assembly acting as a torque transmitting means and also as an expansion joint. Ring 58 is bolted to a substantially rectangular ring 59 which constitutes the outer hoop ring of the first compression stage of the supersonic compressor. The inner side surface of the hoop ring 59 is used for mounting the blades of the compressor all the way around the periphery of this ring. The rings 58 and 59 are made of titanium alloy, which permits higher peripheral velocities than those obtainable with steel rings. Side disc 54 and ring 55 on one side, and ring 58 and hoop ring 59 on the other side, are interconnected by a pivoted ring 60 having a cross-section identical to that of a dumbbell, the two cylindrical surfaces of ring 60 forming a sliding fit within the respective seats. When the rings 58 and 59 expand radially, their expansion exceeds the radial expansion of the side disc 54 and this differential expansion is transmitted and absorbed primarily by the elastic deformation of ring 60. The right sides of the blades of the first compression stage are welded to the left side surface of an outer torque-transmitting hollow cylinder 61, 61a composed of two rings forming a central bolted joint 62. The right side surface of cylinder 61 terminates in a plurality of blades of the second stage of a radial or centrifugal flow turbine. The right sides of the second stage turbine blades are welded to the inner side-surface of a hoop ring 63 which is connected to a side disc 64 in a similar manner to the elastic connection used on the left side of the outer rotating assembly. Disc 64 is connected to the right end 43a of shaft 43 mounted in bearing 11. Ring 45 of bearing 11 forms a sliding fit with shaft 43 to permit axial movement of the entire compressor-turbine rotor combination which takes place due to the thermal and stress expansions.

The left portion of shaft 31 is provided with an integral side disc 65 which forms a similar expansion joint with a hoop ring 66 provided with an accelerating surface 67 for the exit channel of the compressor. The second stage of the compressor is welded on one side to the hoop ring 66 and on the other side to a torque transmitting hollow cylinder 68 similar to the hollow cylinder 61. The first stage of the turbine is carried on one side by cylinder 68a and on the other side by a hoop ring 70 having an accelerating surface 71. The hoop ring 70 is connected to a side disc 72 through an expansion joint, and side disc 72 constitutes an integral part of the right end 31a of shaft 31. The right end of shaft 31 is mounted in bearing 35 whose ring 73 forms a sliding fit with shaft 31.

The right end of shaft 31 is provided with an oil seal 74 and an ignition cable bushing 75. The ignition cable 76 is carried to ignition plugs 77 through a duct in shaft 31. The left side of this duct terminates in the fuel entry fitting 28, this fitting being provided with an oil gland 80.

As clearly seen in Figs. 1a and 1b, the vortex toroidal combustion chamber is centrally located between the compressor and the turbine. The air from the compressor enters radial ducts which will be described more fully in connection with the description of Fig. 14 illustrating the entire combustion heat generator. After entering the toroid, the air follows the contour of the toroid and sets up a vortex in the center of the toroid. The fuel dispersion nozzles are located in the ducts which channelize the compressed air from the compressor into the combustion chamber. The fuel, in a vaporized state, is picked up by the stream of air which is passing by the nozzle and is carried into the toroid where it is ignited and burned, the highest temperature in the toroid being in the center of the accelerated vortex, the acceleration being supplied by hot gases in the center of the vortex which diffuse into the colder gases following the contour of the toroid. The heated gases leave the toroid through exhaust ducts and are mixed with that compressed portion of the air which never enters the toroid chamber but instead follows the ducts permitting this portion of the air to enter the input channel of the turbine directly from the compressor. The chamber is cooled on all sides by means of outer air ducts which carry only compressed air. The above will be described more fully in connection with the perspective view of the entire heat generator illustrated in Fig. 14.

The compressed air which by-passes the combustion chamber through the outer toroid duct 84, and the heated gases from the combustion chamber per se enter a duct 82 which constitutes a radial input duct into a radial turbine having first and second radial stages mounted between hoop rings 70 and 63 on one side and hollow cylinders 68 and 61 on the other side. These two contra-rotating turbine stages are used to rotate in opposite directions the two stages of the compressor, the torque developed by the turbine stages being transmitted to the compressor stages through the hollow cylinders 68 and 61. The two contra-rotating turbine stages are rotating at two different angular velocities, the ratio between these two angular velocities being held constant by the synchronizing gear train between the two rotors of the turbine and the two rotors of the compressor. As will be explained more fully later in this specification, it is indispensable, for optimum operation, to maintain proper vectorial relationships in the compressor and the turbine by maintaining the angular velocities ratio constant between all rotating elements of the power plant. The angular velocity of the power plant is controlled by a governor (not shown) geared to a ring gear 30 which controls the rate of fuel supply furnished to the combustion chamber. This, in turn, controls the temperature of gases leaving the combustion chamber, thereby controlling the angular speed of the turbine and compressor. The governor, therefore, does not maintain this speed constant but adjusts it to maintain a constant Mach number throughout the plant, which is especially desirable because of the supersonic type of compressor.

The walls of the radial entry duct 82 are maintained at a relatively low temperature by ducting cool compressed air from the ducts 84 and 85, located at the outer and inner peripheries of the combustion chamber, along the outer walls of the radial input duct 82. This is illustrated by the arrows in Figs. 1a and 1b. The partially expanded and cooled air leaves the radial turbine in radial direction without any swirl and it then enters a peripheral exhaust duct 86 provided with peripheral turning vanes 87. The gases then leave the exhaust duct 86 and enter a jet pipe, whereupon they are ejected in a form of a jet.

It is important to remove the incoming air boundary layers at the entry to the prerotation stage of the compressor to maintain as uniform velocity profile throughout the compressor as possible since this has a direct influence on optimum functioning of the compressor, the obtained compression ratio, and thus the final efficiency of the compressor. This is accomplished by removing the wall boundary layer at the entry into the prerotation stage by means of peripheral intake slots 88 and 89 illustrated on an enlarged scale in Fig. 2. As illustrated in Fig. 2, the axial length of the prerotation stage is made smaller than the axial length of the radial intake channel with the result that the boundary layer cannot extend itself into the prerotation stage but instead is sucked away through the slots 88 and 89 and connecting holes 90 and 91, uniformly distributed around the periphery of the entry duct adjacent to the inner sides of slots 88 and 89, into peripheral manifolds 92 and 93. Manifold 92 is connected to manifold 93 through a plurality of ducts 94 uniformly distributed around the periphery of the compressor intake duct 10. The peripheral ducts 92 and 93 are thus connected together and then the air from these ducts is conveyed into ducts 95 (see Figs. 1a, 1b, 3, 7 and 9) terminating in an annular duct 96 (see Fig. 1b) positioned at the inner corner of the turbine exhaust duct 86 (see Figs. 1b and 3).

Duct 96 is provided with a plurality of peripherally located holes 97, Fig. 1b, which are so positioned in the stream of the exhaust gases as to act as a plurality of syphons which create suction, drawing the boundary layer of the compressor intake duct into the exhaust jet stream through the previously mentioned slots 88 and 89 (Fig. 2) and the peripherally spaced ducts 95 (Figs. 1a, 1b, 3, 7 and 9) which run parallel to the axis of the plant. The boundary layer suction system will be described more fully in connection with the Figs. 3 through 9.

The cross-sectional views of the ducts used for deicing and for removing the boundary layer are illustrated in Figs. 3 through 9. Fig. 3 illustrates that portion of the exhaust duct 86 (see Fig. 1b) which is directly above the second stage of the turbine. The partially expanded gases leave the second stage of the turbine and enter the peripherally distributed ducts 86 which are provided with the turning vanes 87, as illustrated in Figs. 1b and 3. The exhaust duct 86 is provided with a plurality of radial ducts uniformly distributed around the intake portion of the exhaust ducts 86. Two of such ducts, 100 and 100A, etc., are illustrated in Fig. 5. Ducts 100, 100A, etc., have open ends at their leading edges, and therefore a small portion of the turbine exhaust enters these ducts, as illustrated by an arrow 102 in Fig. 3. This gas then follows ducts 100 in axial direction toward the compressor entry duct 10, Figs. 1a, 1b, 8 and 9, where it discharges into hot air jackets 103, Figs. 1a, 1b, 8 and 9, surrounding the compressor intake duct 10. The hot air jackets 103 alternate with the return hot air jackets 104, Figs. 1a, 8 and 9, the hot air being ducted from the ducts 103 into ducts 104 through radial ducts 105 and 106, Figs. 8 and 9, and a peripheral manifold 107, Figs. 1a and 8. Ducts 104 are connected to longitudinal ducts 108, Figs. 1a, 1b, 3, 7, 8 and 9. Longitudinal ducts 108 terminate in alternate radial partitions or vanes 101 where they terminate in duct openings 109, Figs. 1b and 5, allowing the hot air, used for deicing, to enter or join the jet gases. Therefore, the deicing hot gases are taken at the exhaust of the turbine and then piped over to the intake manifold and are then returned back into the jet. For simplifying the drawings no means have been indicated for heating the turning vanes 11; however, in actual practice they are connected to the ducts 106 on the input side and ducts 105 on the output side so that the hot gases are also used for deicing the turning vanes of the compressor.

It is desirable to keep all intake manifold parts of the compressor at elevated temperature when icing conditions are encountered. The above ducting system supplies the necessary heat to all parts of the intake manifold, including the turning vanes 11 which are heated by conduction from adjacent radial partitions or ducts 105 and 106. The deicing system preferably is in operation continuously since the introduced loss is not significant, and continuous operation of the deicing system has a beneficial effect on maintaining the boundary layer thickness at a minimum even when there is no ice formation conditions.

Figure 10:
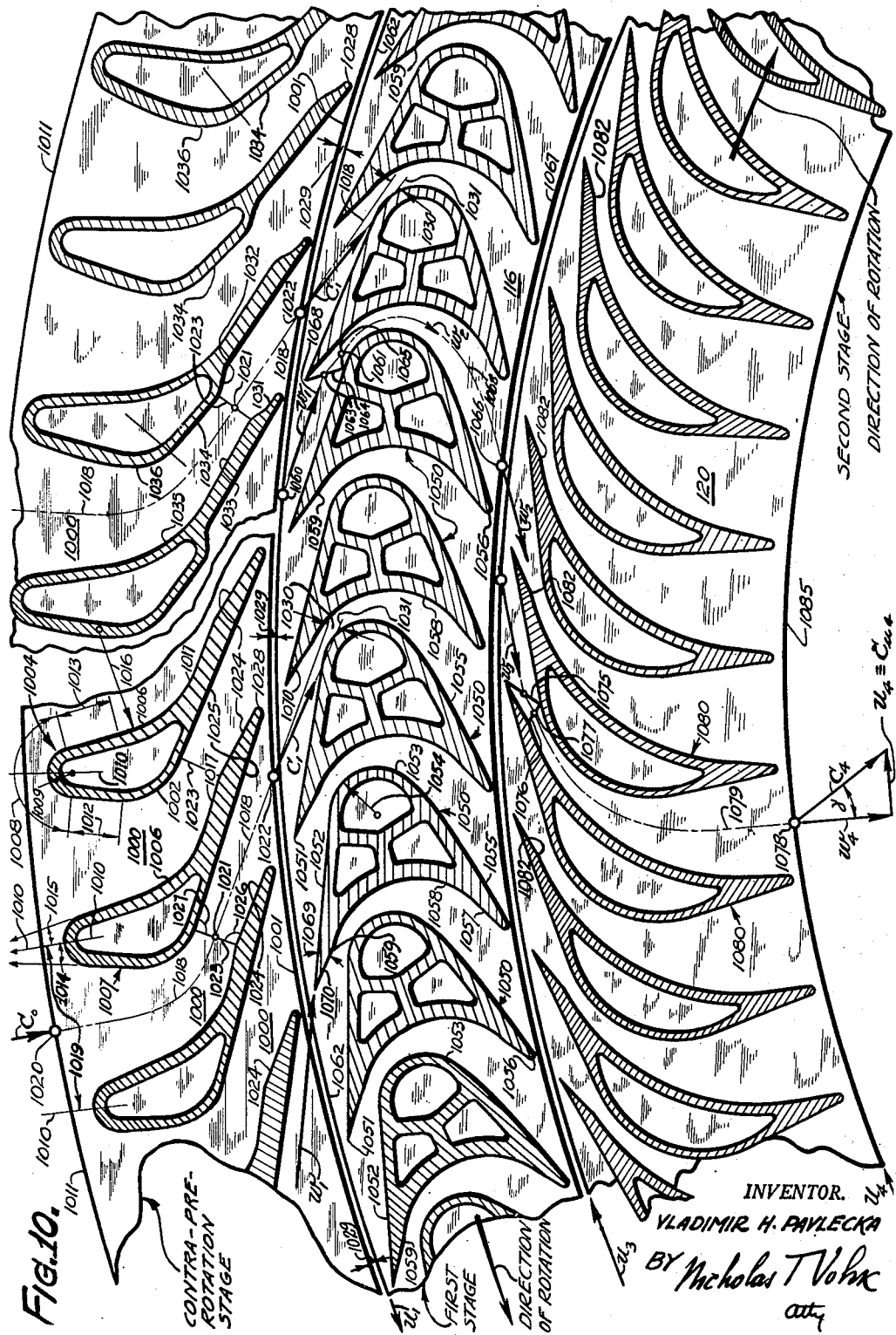
Fig. 10 is a transverse cross-sectional view taken along line 10—10, Fig. 1a, of the prerotation stage and two compression stages of the centripetal compressor.

Referring to Fig. 10, it illustrates the cross-sectional view, normal to the axis of rotation, of two versions of a contra-prerotation stage and two contra-rotating compression stages designed to produce an oblique shock 1063 and 1075 and a reflected shock 1061 and 1077. The contra-prerotation stage on the left side of the drawing has a plurality of cambered blades 1004 defining flow channels having a median flow line 1018. The blades define three regions in the flow channels: pre-acceleration region at the entry into the flow channels, acceleration region in the mid-portion of the channel and the supersonic region defined by flat surfaces 1024—1025 on the left side of the drawing and curved surfaces 1031—1032 on the right side of the drawing. These two types of supersonic regions merely define two types of supersonic nozzles which can be used in the prerotation stage for accelerating the fluid to an absolute velocity $C_1$ and relative velocity $W_1$, both of which are supersonic velocities.

The fluid being compressed, which in this case is ambient air, enters the first compression stage with the supersonic relative velocity $W_1$ which is parallel to the flat surfaces 1052 of the compressor blades when the disclosed compressor is operating at design point. The second flat surface 1070 forms an angle 1069 with surface 1052 with the result that a single oblique acoustic shock 1064 is produced in the compressed air upon its entry into the first compression stage. If the velocity of the air upon its emergence from the oblique shock is still supersonic, an additional acoustic shock, a reflected shock 1065, will be produced in the fluid. Upon the emergence of the fluid from the reflected shock its velocity $W_2$ will be subsonic, and the remaining portion of the flow channel, defined by such surfaces as 1053, 1055, 1058 and 1057, is a constant velocity flow channel, the channel being narrowed down by means of sidewalls 114 and 116 illustrated in Fig. 2.

The compressed air leaves the first compression stage with the relative subsonic velocity $W_2$ and it enters the second compression stage with a supersonic absolute velocity $W_3$ which is parallel to the flat surfaces 1076 of the second stage blades 1080. Oblique and reflected shocks 1075 and 1077 are produced in the fluid in the same manner as in the first compression stage. The remaining portion of the flow channel of the second stage is a diffusion channel since the side-walls 118 and 120 are made parallel to each other and the blades 1080 are shaped so as to produce a widening channel, having an increasing cross-sectional area. Accordingly, the exit velocities $C_4$ and $W_4$ are subsonic.

The rate of diffusion is determined by the use to which the compressed air is subjected. In the disclosed power plant, the compressed air is ducted into the combustion heat generator, Figs. 1a, 1b and 14, which revolves at the same angular velocity as the second compression stage. It leaves the compressor at a relative velocity $W_4$ which is considered to be of proper magnitude to produce the desired degree of swirl in the combustion heat generator, which in turn is determined by the rate of combustion desired in the heat generator. Therefore, the degree of diffusion is a function of the rate of combustion. The relative velocity $W_4$ is, in this case, radial and therefore the absolute swirl velocity $C_{u4}$ is of the same magnitude as the peripheral velocity $U_4$ at this radius, i. e., $C_{u4}=U_4$, and the absolute velocity $C_4$ forms a leading angle $\gamma$ with the radial line.

The shape of the blades in the second stage is determined in the supersonic region in the same manner as the shape of the blades of the first stage in the same region. The two differ in shape, however, because $W_1 < W_3$ and $U_1 > U_2$ This will be discussed more in detail in connection with the vector diagram of the compressor illustrated in Fig. 15.

*Alternative forms of compressor.*—In Fig. 10 a compressor is disclosed which uses oblique and reflected shocks in both stages to obtain the compression of gases. This compressor obtains the highest compression ratio at the highest thermodynamic efficiency for the obtained compression ratio, and therefore offers advantages over the compressors illustrated in Figs. 11, 12, and 13. However, the additional compressors illustrated in the above figures have some of the advantages of their own, as will be described later.

Figure 11:
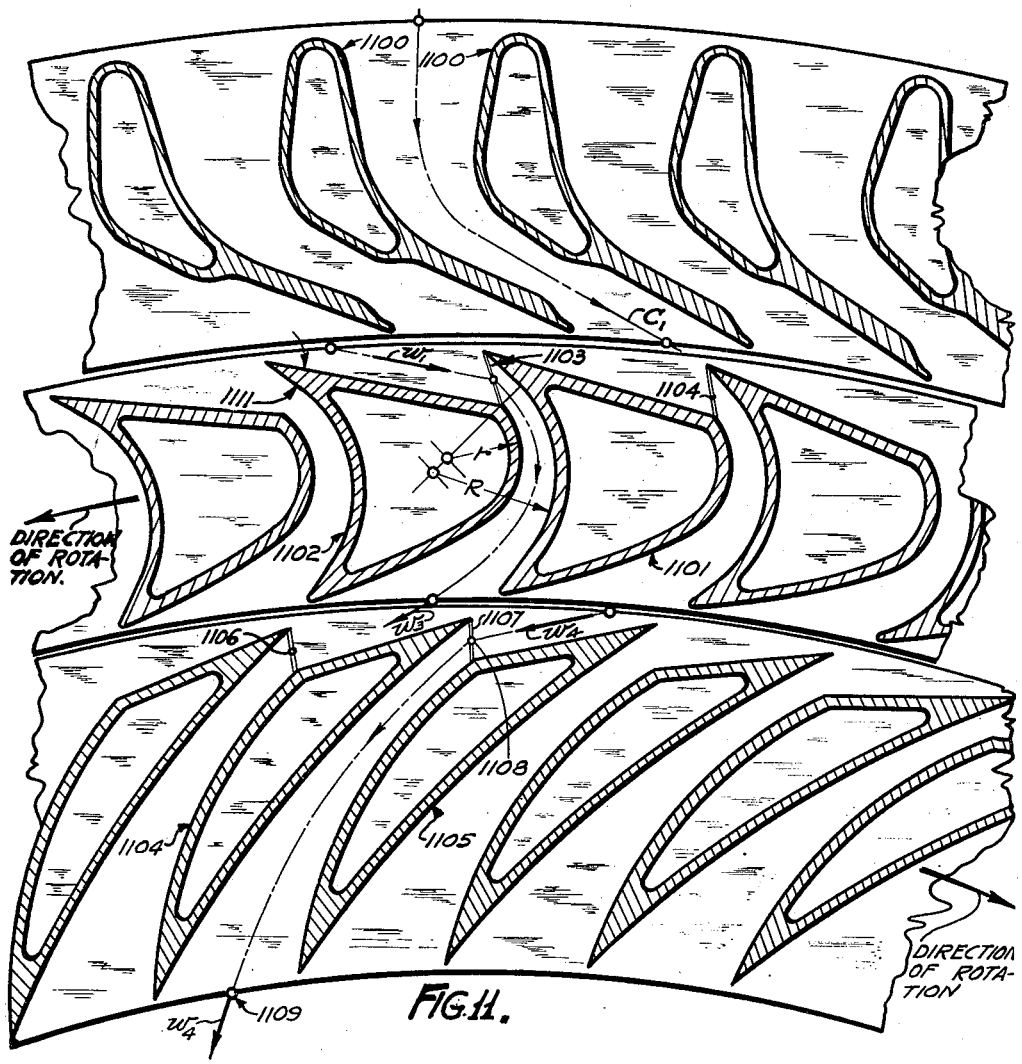

*Oblique shock compressor.*—Referring to Fig. 11, it discloses a two-stage compressor having a supersonic prerotation stage and two supersonic compression stages which utilize only an oblique shock for obtaining compression. Since only oblique shock compression is used in the compression stages, the relative velocity $W_1$ need not be especially high, and therefore the prerotation stage may be a completely subsonic stage. The shape of the blades 1100 would then differ from the blades illustrated in Fig. 11 only in the lower part of the blades. While in Fig. 11 the flow channel terminates in the supersonic expansion nozzles of the types previously described with Fig. 10, the subsonic acceleration channel would then continue to the very end by gradually narrowing the dimension of the flow channel in the plane of the drawing, i. e., in the plane normal to the axis of rotation. The fluid to be compressed leaves the prerotation stage at a subsonic or a supersonic absolute velocity $C_1$, and then enters the flow channel of the first stage at a relative supersonic velocity $W_1$, which must be a supersonic velocity irrespective of whether $C_1$ is subsonic or supersonic. The leading edges of blades 1101, 1102, etc. create oblique shocks, the wave fronts of which are illustrated by inclined lines 1103, 1104, etc. The configuration of the blades in this stage differs from the configuration of the blades illustrated in Fig. 10 by the omission of an edge 1059 between flat surface 1070 and curved surface 1058 since no reflected shock is used in this compressor. Angle 1111 must have the magnitude which will produce only an oblique shock of compression with the entry velocity $W_1$. (The equation for this angle is given later in this specification, in connection with the discussion of Figs. 31 through 34.) The remaining portion of the flow channel preferably is a constant flow velocity channel, as in the case of Fig. 10, since introduction of any diffusion in this channel would only produce the thickening of the boundary layer and reduce the exit velocity $W_3$, thus lowering the compression ratio obtainable in the second compression stage. Stated differently, greater compression ratio is obtained by maintaining $W_3$ as high as possible and therefore any attempt of obtaining some compression by diffusion in the first stage would produce a disproportionate loss of compression in the second stage. The second stage changes in the blades 1104, 1105, etc. are identical to the changes in the blades 1101, 1102 of the first stage, i. e., the edges 1082, Fig. 10, now are eliminated since there is no reflected shock. The oblique shock wave fronts are illustrated by lines 1106 and 1107 in this figure. From then on, i. e., from point 1108 to point 1109, the channel is a subsonic diffusion channel where the compression obtained by the oblique shock 1107 is increased subsonically to a still higher pressure by converting relatively high kinetic energy to potential energy through the process of subsonic diffusion.

The advantages of the compressor disclosed in Fig. 11 are several. Although it does not produce as high a compression ratio as that in Fig. 10, it nevertheless produces a somewhat lower compression ratio at the highest thermodynamic efficiency because of very nearly isentropic process of compression by the oblique shocks. It also will operate quite effectively and efficiently in the subsonic region, and therefore will "pull in" into subsonic region without any difficulties. This is so because of the absence of sharp transverse edges 1059 and 1082, Fig. 10, which are apt to cause a certain amount of separation in the subsonic region, in the compressor disclosed in Fig. 10.

*Oblique, reflected and normal shock compressor.*— Fig. 12 discloses a compressor which utilizes oblique, reflected, and normal shocks. In this case, the relative velocity $W_1$ of the fluid at the exit of the prerotation stage must be high in order to produce three shocks in the compression stage. The prerotation stage, therefore, must have a supersonic nozzle, identical to the nozzle disclosed in Fig. 10, which will produce supersonic velocity $W_1$. Sides 1200 and 1201 of blades 1202 and 1203 are identical flat surfaces parallel to the relative velocity $W_1$. Angles 1204 and 1205 are computed according to the formula given in the divisional application Ser. No. 529,504, filed August 19, 1955, and entitled "Supersonic Centripetal Compressor" (latter part of the specification to produce oblique, reflected, and normal shocks with the given supersonic relative velocity $W_1$). The wave fronts of these shocks are 1206, 1207, and 1208 respectively. One of the requirements of the compression channel utilizing normal shock is that its minimum width must be at the position where the appearance of the normal shock is desired, which is the case in Fig. 11. From then on the channel may be either a diffusing channel or a constant velocity channel, the latter offering the advantages mentioned in connection with Fig. 10, i. e., higher compression ratio is obtained in the second stage when $W_2$ is maximum, since $W_2$ is maximum, $W_3$ is also maximum. The next stage is similar to the first stage up to, and including, the minimum channel width where normal shock 1210 is produced. From then on the channel is a diffusing channel. The position of the median line 1211 determines whether the absolute exit velocity $C_4$ is radial or has a rotational swirl, as may be desired in the disclosed power plant because the compressor is used with the rotating combustion heat generator.

The compressor in Fig. 12 produces the highest compression ratio because of the use of three shocks, but this high compression ratio is produced at a decreased thermodynamic efficiency. This compressor also presents some structural limitations in that the angles 1204, 1205, etc. are small and therefore the leading edges of the blades are less rigid. The "pulling-in" characteristic is inferior to that of the compressor disclosed in Fig. 10, and even more so than of the compressor disclosed in Fig. 11.

*Oblique and normal shock compressor.*—Fig. 13 discloses a compressor in which the prerotation stage has a supersonic nozzle, and the compression stages produce oblique and normal shocks. The compression ratio of this compressor can be as high as that of the compressor illustrated in Fig. 10 and also in Fig. 12 if $W_1$ are equal in all cases.

All compression stages utilizing normal shock require sharp edges 1209, 1214, Fig. 12, 1300 and 1301, Fig. 13, extending through the entire length of the channel, to locate and keep the position of the normal shocks in fixed positions with respect to the blades and at the minimum width of the channel. For a more detailed description of the supersonic centripetal flow compressors, reference is made to the aforementioned divisional application 529,504.

*Combustion chamber.*—The toroidal combustion chamber disclosed in Figs. 1a, 1b, 7 and 14 has the following advantages: stationary flame front, low resistance to the flow of compressed air, and air-cooled walls for the inner toroid. None of the above essential features are present in the known "canister" and "annulus" types of combustion chambers.

Only a brief description of the combustion chamber will be given here, a more detailed description appearing in the divisional application entitled "Combustion Chambers for Gas Turbine Power Plants" having Serial No. 606,451, filed August 27, 1956. The divisional application is hereby made a part of this disclosure.

Referring to Figs. 1a, 1b and 14, governor and fuel pump 83 of Fig. 1a is driven from shaft 31, which is driven by the first turbine stage. The fuel, which may be any standard jet engine fuel, then enters fuel hose 29, then fuel coupling 28, whereupon it follows the central fuel duct 130 in the hollow shaft 31 which is rotating with the angular velocity of the 1st stage of the turbine and the 2nd stage of the compressor as well as the angular velocity of the combustion heat generator. As illustrated in Fig. 1b, the right end of the fuel duct 130 is closed off, and the same end of the duct is provided with eight radially disposed fuel conduits 132, Figs. 7 and 14, which are drilled through transverse ribs interconnecting radial vanes 134, 135, 136, 137, 138, etc., Figs. 14 and 7, these radial vanes forming eight input ports 140 through 144 (only five input ports are visible in Fig. 14 and two input ports, 140 and 141, in Fig. 7) and eight output ports, such as 148 and 149. The outer ends of the radial conduits 132 terminate in eight fuel nozzles 150 through 155, etc. Figs. 14 and 7, which supply the fuel in gaseous form into the toroidal combustion heat generator chamber 156 having an outer wall 157.

The compressed air, after leaving the second compressor stage, follows four paths; the first path leads the air into combustion chamber; the second path, although it by-passes the combustion chamber proper, it nevertheless flows through the combustion chamber ports and then is mixed with hot gases leaving the combustion chamber; the third path follows an outer duct surrounding the outer periphery of the combustion chamber, and the fourth path follows the inner periphery of the combustion chamber, the last two paths cooling the combustion chamber on all sides. The first and second paths are indicated in Fig. 1 by arrows marked "Air for Burning" (first path) and "Air for Mixing" (second path). The third and fourth paths are also indicated in Figs. 1a and 1b by the arrows following the ducts which are located around the outer and inner peripheries of the combustion chamber. The third path is also illustrated in Fig. 7 by ducts 159, the fourth by duct 158, the first by ducts 140 and 141, Figs. 7 and 14, and the second path by eight ducts 160 through 163, Fig. 14, the additional ducts not being visible in Fig. 14. Ducts 160 through 163 are also visible, in the vertical plane, in Fig. 1 where they are indicated, as mentioned previously by the arrows marked "Air for Mixing." Referring to Fig. 14, duct 158 is concentric with the fuel duct 130, and extends through the entire axial length of the combustion heat generator, whereupon it joins the input duct of the turbine, as illustrated in Fig. 1.

The first path, i. e., the air used for combustion, enters input ports 140 through 144, which are wedge shaped, with the sharp end of the wedge pointing in the direction of the turbine. The edge of this wedge is skewed in the radially outward direction, or in the direction of the combustion chamber 156 to direct the incoming air into the toroid of the chamber. These edges are also provided with slits 166, 167, Figs. 14 and 7, which permit some of the air to pass directly into the input turbine duct. These slits are provided to insure uniform mixing of hot and cold gases. Because of the wedge-shaped configuration of ports 140 through 144, and the skewed terminations of these ports, by far the largest portion of the air entering these ports enters combustion chamber 156. Hot gases leave combustion chamber 156 through ducts 148, 149, etc., which are also wedge-shaped, with the wide ends of the wedges pointing in the direction of the turbine. Thus, the cold air ports, supplying air to the combustion chamber, are interleaved with the hot gas ports, the wedge-shaped side-walls of the cold air ports also constituting the walls of the hot gas output ports, i. e., the two types of ports having common walls, and being nested adjacent to each other to form a right cylinder. Examination of the geometry of these ports indicates that the inner periphery of the toroidal vortex, i. e., adjacent to the ports, will represent interleaved streams of cold air and hot gases, the cold air entering the combustion chamber and the hot gases leaving it. The same type of interleaved, alternating streams of cold air and hot gases will be present immediately on the output side of the combustion chamber and the input duct of the turbine where uniform gas stream is obtained not by turbulent mixing but by mutual diffusion between the cold and hot streams. Elimination of turbulent mixing eliminates needless losses. A more detailed description of the toroidal chamber appears in the divisional application Serial No. 606,451, mentioned previously in this application.

*Centrifugal turbine.*—The centrifugal turbine must deliver sufficient power to drive the compressor and all accessories, and it must do so by discharging gases from the last stage at as low velocity as possible, and at as low temperature as possible, which will create high propulsive efficiency. High propulsive efficiency, nevertheless, should not be accomplished at a disproportionate sacrifice of the thermodynamic efficiency, the latter being a function of the maximum temperature of the thermodynamic cycle of the power plant. In selecting this maximum temperature one ordinarily is limited by the maximum temperature which can be withstood by the first stage of the turbine, which is of the order of 1500° F. at present with the existing alloys. The thermodynamic cycle of the turbine and the effect of the gas velocity and temperature on the overall efficiency of the jet power plant will be discussed more in detail in the appendix. The above energy transformation, moreover, should be accomplished in two contra-rotating stages if sufficient power can be derived from them for driving the compressor; introduction of any additional stages would then serve no useful purpose. An additional severe limitation is imposed on the turbine in terms of possible peripheral speeds; since the first stage of the turbine is at higher temperature, its peripheral velocity must be lower than that of the compressor because of purely mechanical considerations. The proportional limit of available metals limits this velocity to approximately 830 feet per second, up to about 500° F. which means that at least the first stage of the turbine should have a diameter smaller than the diameter of the output stage of the compressor since the first turbine stage, at least on the input side, is exposed to the maximum temperature of the thermodynamic cycle, i. e., of the order of 1500° F. This last requirement and the number of stages, i. e., two stages, means that a large amount of mechanical energy must be derived by means of a limited mechanical structure. In arriving at the most effective solution of this problem one must also keep in mind that the gases at their entry into the first stage of the turbine have a swirl velocity $C_{n4}$. The disclosed solution first utilizes the momentum of this velocity, and since after the complete utilization of this momentum, the only available energy is in the state of gases, which are at relatively high temperature and pressure at this stage, the only further transformation of the available thermal energy into mechanical energy that is possible is by creating new momentum by expansion of gases through the turbine stages.

When relatively low compression ratio is used, such as the one obtainable with a two stage compressor utilizing only an oblique shock (see Fig. 11) the power which must be delivered by the turbine is proportionately less than the power needed to drive the compressors using oblique, reflected and normal shocks in all the compressor stages (Fig. 12) or oblique and reflected shocks (Fig. 10). A more efficient turbine can be obtained if three turbine stages and one turning stage are used for driving high pressure compressors. The three-stage turbine is illustrated in Fig. 18. For the compressors illustrated in Fig. 13 (oblique and normal shocks) sufficient power is obtainable from a two-stage turbine, which will be described below. It should be noted here that the compressor of Fig. 13 may require either a two-stage or a three-stage turbine, depending on the desired intensity of the normal shock.

Proceeding with the description of the two-stage turbine, creation of the new momentum must be accomplished at a high rate if one is to derive sufficient power from the two turbine stages. The creation of the new momentum is accomplished, in view of the above, at the highest available rate, i. e., at the supersonic rate. The resultiing momentum is utilized for propelling both stages, the greater portion of this newly created kinetic energy being utilized in the first stage because of high momentum created within the first stage. This momentum produces high expansion ratio and large temperature drop within the gases flowing across the first stage. This high rate of energy conversion is also possible because of almost double effective peripheral velocity existing between the two stages produced by the rotation of the two stages in the opposite directions. The expansion of gases in the second turbine stage must, of necessity, be of limited nature if one is to discharge the gases at as low exit velocity as possible, and to impart to this discharge velocity, $C_{t4}$, a purely radial direction. Accordingly, the second turbine stage takes the form of a multiplicity of expansion channels defined by sharply curved blades.

Figure 15:
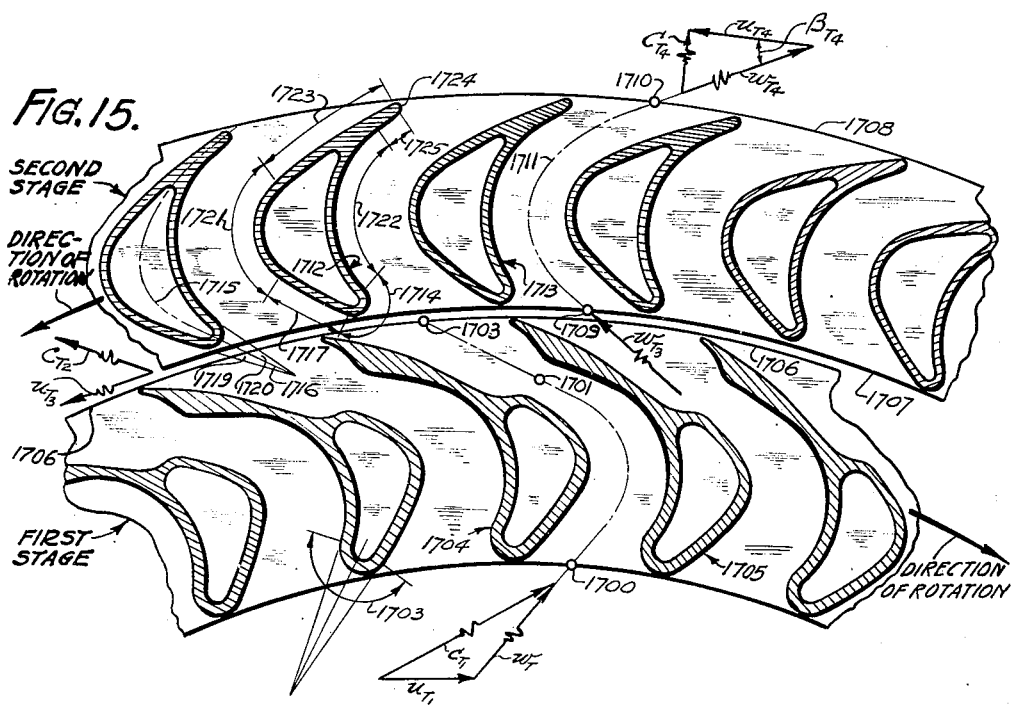
Fig. 15 is a transverse cross-sectional view, taken along line 17—17, Fig. 1b, of the two-stage supersonic-subsonic centrifugal turbine.

Referring to Fig. 15, the gases move along the input duct leading to the first stage with a relative velocity $W_{T1}$, which may be a purely radial velocity. The inner periphery of the first stage is rotating at peripheral velocity $U_{T1}$, the value of which is determined by selecting proper mean diameter for this stage and then specifying the mean peripheral velocity which can be withstood by the metal used for the turbine. With an alloy, known in trade as S590 or S816 (Allegheny Ludlum Alloys) this speed may be of the order of 800 feet per second, which at once determines the magnitudes of $U_{T1}$ and $C_{T1}$. The entry channel of the first stage, therefore, assumes the form of an accelerating channel which is curved in the direction opposite to the direction of rotation for full utilization of the momentum of the gases due to the existing swirl, and at the same time accelerating this flow for the creation of new momentum and additional reaction. This part of the channel is from point 1700 to 1701. Since $W_{T1}$ is a subsonic velocity of very low Mach number, the entry edges 1703 of the turbine blades 1704, 1705, etc. assume the form, the geometry of which is similar to the entry edges 1008 of the prerotation stage of the compressor, Fig. 10. The geometry of the acceleration channel 1700—1701 is quite similar to the acceleration channel 1020—1021 of the same prerotation stage. At point 1701, the position of which is determined primarily by the minimum desirable length which must be allotted for a supersonic expansion nozzle 1701—1703, the gases are further accelerated at supersonic rate. It is this newly created momentum which furnishes most of the power made available at the exit from the first stage, which is defined by the perimeter 1706 of the first stage. Gradual acceleration of gases from point 1700 to point 1701 and very rapid acceleration to point 1703 creates a gradual temperature drop in the subsonic region and a greater temperature drop in the supersonic region. This large temperature drop takes place because of rapid expansion, especially in the supersonic region. This large temperature drop also produces an additional beneficial effect by allowing operation of the trailing portions of the blades 1704, 1705 at a reduced temperature, i. e., where the stresses are greatest the temperature is least. No additional detailed description of the geometry of the entire channel 1700—1703 and of the blades 1704, 1705, etc. appears to be necessary since this stage of the turbine has basically the same configuration as the prerotation stage of the compressor, the two being reversed with respect to each other because of the reversal of the two gas flows.

Since the second turbine stage is rotating at approximately the same mean peripheral velocity in the opposite direction, the absolute supersonic exit velocity $C_{T2}$ becomes at once a rather low relative subsonic velocity $W_{T3}$, which is the velocity at which the gases enter the second stage of the turbine at the inner periphery 1707 of this stage. The peripheral velocities of this stage are $U_{T3}$ and $U_{T4}$, the latter being greater in proportion to the greater radius of the outer periphery 1708. Since $U_{T4}$ is quite high, it becomes possible to have a rather high (but subsonic) relative exit velocity $W_{T4}$, which is reduced by $U_{T4}$ to an absolute exit velocity $C_{T4}$, which should be a radial velocity vector to avoid any swirl and the concomitant parasitic losses in the jet pipe. The relative exit velocity $W_{T4}$ is greater than the relative entry velocity $W_{T3}$, which allows to have a considerable amount of expansion in the second stage. Therefore, channel 1709—1710 is an expansion channel with proper degree of turning for maximum utilization of the available momentum. The degree of turning in this channel should be such as to make $C_{T4}$ radial and only as large as necessary for the transportation of gases to the end nozzle of the jet pipe with the least amount of loss, as will be described more in detail later. Therefore, $\beta_{T_4}$, which is the angle between $W_{T4}$ and $U_{T4}$, primarily is a function of $C_{T4}$, and this angle at once defines the angle which the mean flow line 1711 makes with the tangent at point 1710. The shape of blades 1712, 1713, etc. is as follows: the leading edges 1714 are circular in form, and the straight line or extension 1716 of the median line 1715 is parallel to the relative entry velocity $W_{T3}$. The cylindrical edge 1714 then blends into substantially flat surface 1717 and arc 1722 which form equal angles 1719 and 1720 with line 1716. Surfaces 1721 and 1722 are two cylindrical surfaces making tangential junctions with the respective surfaces 1717 and 1722. The remaining concave surface of the blade is a convex arc 1723 terminating in a small cylindrical surface 1724, which constitutes the trailing edge of the blade. On the concave side, the cylindrical surface 1722 and the trailing edge 1724 are joined by a substantially flat surface 1725. The above configuration represents a reasonable approximation of a more rigorous blade contour obtainable by conformal mapping which would not produce strictly circular or substantially flat surfaces.

*Three-stage compressor.*—It has been previously stated that high compression ratio compressors require a three-stage turbine. The three-stage turbine will be described later, in connection with the description of Figs. 16 and 18. The three-stage turbine, however, has sufficient power to drive a three-stage compressor, which is capable of producing a higher compression ratio than the two-stage compressor. The three-stage compressor will be described first, and this will be followed with the description of the three-stage turbine.

Fig. 16 is the longitudinal axial cross-sectional view of the upper portion of the power plant disclosing the three-stage compressor and turbine. Comparison of Fig. 16 with Figs. 1a and 1b reveals that the combustion heat generator 1900, the inner stage 1901 of the compressor, and the input stage 1902 of the turbine are mounted and constructed in the same manner as the corresponding elements of the two-stage power plant, although the actual dimensions and the transverse blade cross-sections of these stages differ from those in Figs. 1a and 1b, as will appear in subsequent descriptions of Figs. 17 and 18. The chief difference resides in the introduction of different type of mounting for the first compression stage 1903, introduction of the stationary compressor stage 1904, and introduction of the additional compression stage 1905, which is the second compression stage of the compressor, the third stage being stage 1901. Thus the second stage of Figs. 1a and 1b corresponds to the third stage 1901 in Fig. 16 because it rotates in the opposite direction to stage 1905. The air enters the input duct 1906 and is directed to the prerotation stage 1907 whereupon it is compressed in the four stages: first rotational stage 1903, stationary stage 1904, second rotational stage 1905 and third rotational stage 1901. The first stage 1903 is mounted on two hoop rings 1908 and 1909, the inner hoop ring 1909 being attached to the outer hollow cylinder 1910 which transmits rotating torque from the turbine to the first two stages of the compressor. Fastening of the first stage 1903 to the outer hollow cylinder is accomplished by means of studs not illustrated in the figure because of small scale of the drawing. The studs are countersunk in a ring-shaped rib 1911 which forms an integral part of the inner hoop ring 1909. The outer hollow cylinder 1910 is provided with a plurality of scallops 1912, uniformly distributed around the periphery of cylinder 1910, to relieve local stresses. It is to be noted that the studs and the ring-shaped rib 1911 transmit only rotating torque, all stresses due to centrifugal force are being resisted by the hoop rings 1909 and 1908. The second rotational stage is mounted directly on the end periphery of the outer hollow cylinder 1910 which extends all the way up to the blades 1905 of the second stages. Therefore, the second stage blades are mounted between the cylinder 1910 edge and an outer hoop ring 1914. Hoop ring 1914 is elastically attached to a side disc 1916 by means of an elastic diaphragm 1915 having a cross-section of a dumb-bell, as seen in Fig. 16. Side disc 1916 corresponds to the side disc 54 in Figs. 1a and 1b which constitutes an integral part of the outer or second shaft 43. The method of mounting disc 1916 is identical to that of the side disc 54 in Fig. 1a. The stationary stage 1904 is fastened to the stationary frame of the engine by means of flanges 1917 and 1918 which integrate a hollow hoop ring 1919 and frame members 1920 and 1921 into a single integral structure. The blades 1904 of the stationary stage are mounted between the two hoop rings 1919 and 1922. No detailed description of the mounting structure of the third compressor stage 1901 is required here since it is identical to the type of mounting used in connection with the second stage of the compressor in Fig. 1a.

Figure 20:
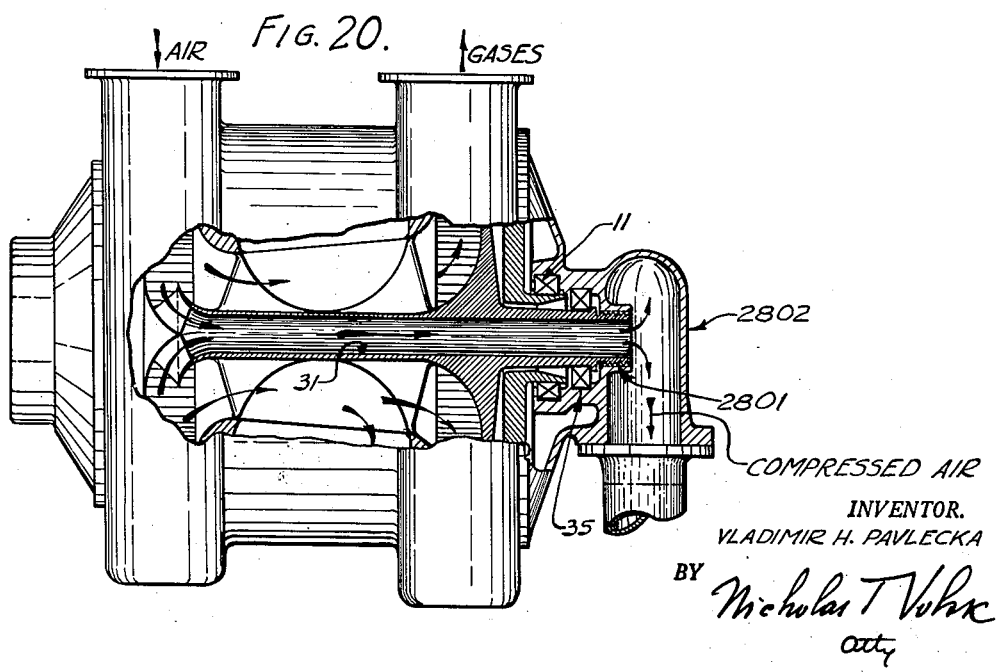
Fig. 20 is a side view of a power plant having a duct for supplying compressed air.

Comparison of the type of mounting used in connection with the three-stage compressor with the type of mounting used for the three-stage turbine reveals the fact that they are similar in all respects. The input stage 1902 of the turbine is mounted in the same manner as the input stage of the turbine in Fig. 1b, and the second and third stages 1924 and 1926 are mounted on the cylindrical drum 1910 and side disc 1928 in the same manner as the first and second stages 1903 and 1905 of the compressor. The stationary stage 1930 is carried by the frame members 1932 and 1934. As in the previous construction, elastic diaphragms 1936 and 1938 are used for connecting the turbine hoop rings 1940 and 1942 to the side discs 1928 and 1946. The cross-sectional views of the compressor and of the turbine are illustrated in Figs. 20 and 22.

Figure 17:
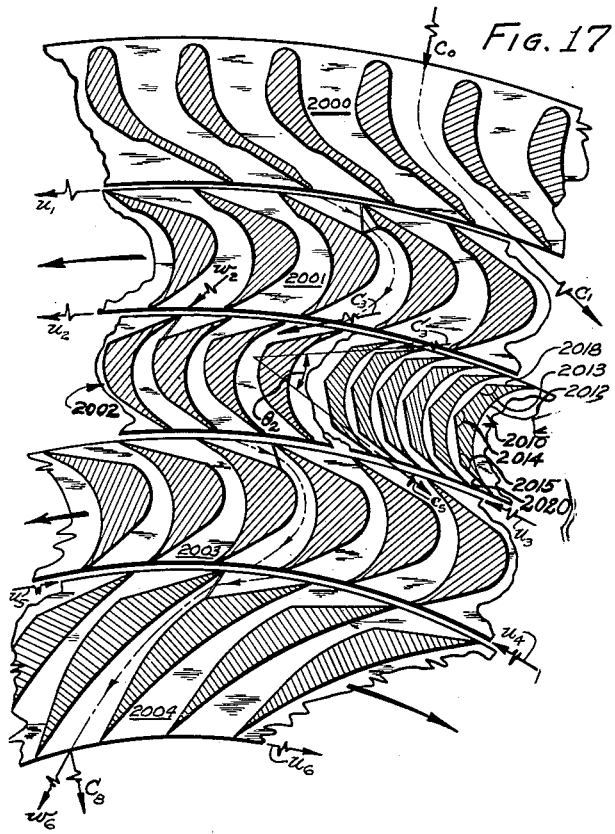
Fig. 17 is a transverse cross-sectional view, taken along line 20, Fig. 16, of the three-stage centripetal compressor.

Fig. 17 illustrates the cross-sectional view of the three-stage compressor, the section lying in a plane perpendicular to the axis of rotation of the compressor as illustrated by line 20—20 in Fig. 16. The prerotation stage 2000 of the three-stage compressor is identical to the prerotation stage of the two-stage compressor illustrated in Fig. 10. The same is true of the first compression stage 2001 in which the blades are constructed to produce oblique and reflected shocks. The next stage is a stationary stage which may be constructed as a purely turning stage or as a stage which turns the direction of flow in the direction opposite to the direction of rotation of the next compression stage as well as compresses. The turning-and-compressing version is more efficient, and therefore is preferable to the mere turning stage. The compression-and-turning stage is illustrated at 2002. No detailed description of the shape of the blades and flow-channel is necessary in connection with this stage since it is similar to the compression stages illustrated in Fig. 11 which function on the principle of a single oblique shock produced by the leading edges of the blades.

It should be mentioned here that although all channels in the compression stages 2001 and 2003 and the stationary stage 2002 appear to be diffusion channels as viewed in Fig. 17 because of their pronounced divergence in the radial or centripetal direction, this appearance is misleading, and should be considered together with their appearance in Fig. 16, which illustrates that there is constriction of the axial dimensions of these channels, as illustrated at 1907—1903 for the first stage, 1903—1904 for the stationary stage, and 1904 and 1905 for the second stage of the compressor. In view of the above, the lower portions of these channels, as viewed in Figs. 16 and 17 are constant velocity channels. Thus, the constant velocity channel principle, discussed previously in connection with the two-stage compressor, and especially the side-surfaces 114 and 116, Fig. 1a, of the first stage, are applicable here as well.

The last stage 2004 of the compressor is similar to the second compression stage illustrated in Fig. 11.

Fig. 17 also illustrates at 2010 another version of the stationary stage. In this version the stationary stage is a purely turning stage. Since the absolute velocity $C_3$ is a supersonic velocity, the only way to achieve this turning is by means of Prandtl-Meyer turning, which is illustrated in the figure. One side of the blades has a purely cylindrical surface, which is surface 2012, while the other surface is polygonal having either two or three angles of turning. Three angles 2013, 2014, and 2015 are illustrated in the figure, which are equal to each other and are uniformly distributed around the periphery of the blade. Therefore, each angle is equal to the total angle of turning 2122 divided by three; this angle is complementary to the angle between the absolute entry velocity $C_4$ and the exit velocity $C_5$. Surface 2018 is parallel to the entry velocity $C_4$, surface 2020 is parallel to the exit velocity $C_5$ and the cylindrical surface 2012 is tangent to these surfaces at the outer and inner peripheries of the stage, which closes the perimeter of the entire figure. For a more detailed description of the three-stage compressors, reference is made to the continuation-in-part applications Ser. No. 513,947, filed June 8, 1955, and entitled "Radial Dynamic Machines Including Centripetal Compressors and Centrifugal Turbines," and Ser. No. 514,001, filed June 8, 1955, and entitled "Methods of Compressing Fluids With Centripetal Compressors."

*Three-stage turbine.*—Fig. 18 is a cross-sectional view of the three-stage turbine taken in a plane perpendicular to the axis of its rotation. The first stage of the turbine is similar to the first stage of the two-stage turbine, some difference in the angles and dimensions of the blades existing between the above two first stages because of the smaller radii of the inner and outer peripheries 2200 and 2201 of the stage of Fig. 18 as compared to the radii of the corresponding peripheries of the first stage in the two-stage turbine in Fig. 15. The decrease in the radii is desirable for accommodating, in the radial direction, two additional stages, 2203 and 2204, of the turbine without marked increase in the overall diameter of the turbine. As in the case of Fig. 15, the first stage terminates in a supersonic nozzle, and the outer part of the blades is stiffened by introducing ribs 2205. The momentum of the swirl velocity $C_{T1}$ is fully utilized in stage 2200. The remaining stages of the turbine are all reaction stages, with the flow channels having decreasing cross-sectional areas in the centrifugal or radially outward direction. Therefore, all of the channels are expansion or acceleration channels. The same is true of the stationary stage 2203. The degree of turning and acceleration in each stage is determined from the solution of the vector triangles and power requirements imposed on the turbine in accordance with the known expansion principles of gases in turbines.

Figure 19:
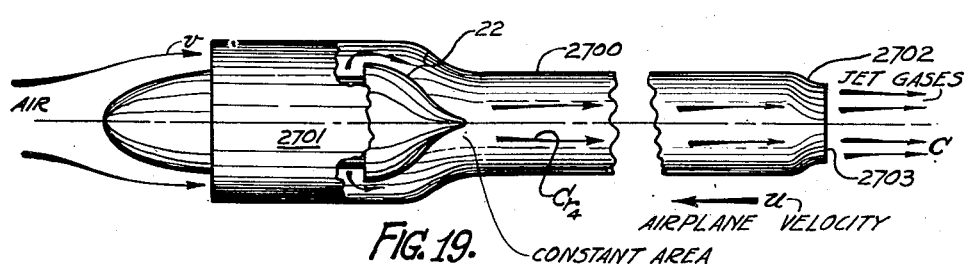
Fig. 19 is an elevational view, partly in section, of the jet engine and its jet pipe.

*Jet pipe.*—Fig. 19 discloses a cross-sectional view of the jet pipe 2700 which receives jet gases from the duct 22 connected to the turbine, the power plant per se being illustrated in block form at 2701. The exit velocity is of the order of 500 feet per second, which is quite low as compared to the presently used jet pipe velocities which are of the order of 1500 to 1600 feet per second. It is advantageous to transport the jet gases to the exit at low velocity since this decreases friction losses. Therefore, in the disclosed plant the jet pipe terminates in an expansion nozzle 2702 which converts the pressure energy of gases into kinetic energy to obtain high momentum, which creates the thrust. The nozzle 2702 is proportioned to give the desired gas velocity at the exit plane 2703 which would give the maximum propulsive efficiency for a given aeroplane velocity in accordance with the equation $$N_p = \frac{2}{1+\frac{C}{U}}$$

where $N_p$=propulsive efficiency
$C$=jet velocity at plane 2703
$U$=aeroplane flight velocity

*Air compressor power plant.*—Fig. 20 discloses application of the power plant of Figs. 1a and 1b to the generation of compressed air. In this case the compressed air is ducted through the hollow shaft 31 and only sufficient air is supplied to the combustion chamber to drive the compressor. The compressed air may be used for any industrial purpose external to the power plant, which may include a free turbine. In the latter a second combustion chamber, near the free turbine, is used for independent power generation either at constant or variable torque. A labyrinth seal is provided for making proper connection between the rotating shaft 31 and the stationary duct 2802.

I claim:

1. A power plant comprising a centripetal compressor having at least an input compression stage and an output compression stage having a common axis of rotation, said input and output compression stages being symmetrically located with respect to a first transverse plane perpendicular to said axis of rotation, said first transverse plane bisecting said compression stages, a radial centrifugal flow turbine having at least an input stage and an output stage having the same axis of rotation as the axis of rotation of said compressor, said turbine stages being symmetrically located with respect to a second transverse plane perpendicular to said axis of rotation, said second transverse plane bisecting said turbine stages, and a combustion chamber fluid-dynamically interconnecting the output stage of said compressor with the input stage of said turbine, said combustion chamber being positioned between said first and second transverse planes, whereby, the compressed air leaving said compressor discharges directly into said chamber, and the products of combustion from said chamber discharge directly into said turbine, said combustion chamber having means for preventing, or minimizing, transfer of heat from said chamber to said compressor, said combustion chamber also acting as a spacer between said compressor and said turbine for preventing transfer of any heat from said turbine to said compressor.

2. A power plant as defined in claim 1 in which said compressor includes means for compressing working fluid with the aid of acoustic shocks.

3. A power plant as defined in claim 1 in which said turbine includes a first rotatable turbine stage having a plurality of cambered blades, the lagging, exit portions of said blades being shaped to form supersonic expansion nozzles for expanding working fluid at a local relative velocity having a Mach number greater than one.

4. A power plant as defined in claim 1 in which said turbine has at least first and second stages, and said combustion heat generator is mechanically connected to the output compression stage of the compressor and to the first stage of said turbine and is rotatable with said first stage of the turbine and the output stage of said compressor.

5. A power plant as defined in claim 1 in which said compressor includes a stationary contra-prerotation stage, and at least two supersonic compression stages.

6. A power plant as defined in claim 1 in which said compressor includes a stationary supersonic prerotation stage and a plurality of supersonic compression stages, and said radial turbine includes at least as many rotatable stages of there are rotatable stages in said compressor.

7. A power plant as defined in claim 1 in which said turbine includes first and second contra-rotating centrifugal turbine stages, said first turbine stage directly discharging into said second turbine stage, a stationary turning stage, and a third centrifugal turbine stage mechanically connected to said second turbine stage, said stationary turning stage being positioned between the outer periphery of said second turbine stage and the inner periphery of said third turbine stage.

8. A power plant as defined in claim 1 in which said combustion chamber comprises a hollow toroid, a plurality of input ports within said toroid for introducing air into said toroid in tangential direction with respect to said toroid, thereby creating a transverse free vortex air current within said toroid, means for injecting fuel into said toroid, and a plurality of output ports within said toroid for discharging products of combustion in tangential direction away from said toroid.

9. A power plant as defined in claim 1 in which said combustion chamber comprises a plurality of inter-leaved wedge-shaped input and output ports, said input ports opening in the direction of said compressor, and said output ports opening in the direction of said turbine, and a hollow toroidally shaped member surrounding all of said ports, said ports and said toroidally shaped member, in combination, comprising said combustion chamber.

10. A power plant comprising a combination of a centripetal compressor and a radial, centrifugal flow turbine; a first split shaft having a left side and a right side; an output compressor stage supported by and rotatable with said first shaft, an input turbine stage supported by and capable of rotating said first shaft when said power plant is in operation; and a combustion heat generator coupling the output stage of said compressor with the input stage of said turbine; said combustion heat generator being centrally located between said compressor and said turbine; and said output compressor stage, heat generator and the input turbine stage being mounted between the inner ends of said left and right sides respectively of said shaft, said combination constituting a single mechanically integrated unit rotatable on said first shaft by the input stage of said turbine when said power plant is in operation.

11. A power plant as defined in claim 10 which also includes a second combination including a second split shaft having a left side and a right side concentrically and rotatively mounted with respect to the left and right sides, respectively, of said first shaft, an input compressor stage connected to and supported by the inner ends of the left side of said second shaft, a second turbine stage connected to and supported by the inner end of the right side of said second shaft, and a drum interconnecting the adjacent sides of said input compressor stage and said second turbine stage, said second combination constituting a single mechanically integrated unit rotatable on said second shaft by the second stage of said turbine when said power plant is in operation.

12. A power plant as defined in claim 11 which also includes a synchronizing gear train interconnecting said first and second shafts for continuously maintaining the angular speeds of said shafts in fixed relationship with respect to each other irrespective of the magnitude of the power generated by the input and second stages, respectively, of said turbine when said power plant is in operation.

13. A power plant comprising a first shaft, an output stage of a centripetal compressor, a toroidal combustion chamber and an input stage of a radial, centrifugal flow turbine, all mounted on and rotatable around said first shaft by the input stage of said turbine when said power plant is in operation.

14. A power plant as defined in claim 13 which also includes a second shaft concentric with said first shaft, and additional compressor and turbine stages both mounted on and rotatable around said second shaft by said additional stage of said turbine in the direction opposite to the direction of rotation of said first shaft when said power plant is in operation.

15. A power plant including first and second concentric shafts, a first compression stage and a second turbine stage fixedly mounted on said first shaft, a second compression stage and a first turbine stage fixedly mounted on said second shaft, and a combustion heat generator fixedly mounted on said second shaft, said combustion heat generator fluid dynamically connecting said second compression stage with said first turbine stage.

16. A gas turbine power plant comprising a centripetal compressor having a stationary contra-prerotation stage and first and second sets of contra-rotatable compression stages, first and second concentrically mounted shafts, a multi-stage centrifugal flow turbine having first and second sets of contra-rotatable turbine stages, said first set of the compression stages and said first set of the turbine stages being fixedly mounted on said first shaft, and said second set of the compressor stages and said second set of the turbine stages being fixedly mounted on said second shaft, and a combustion chamber fixedly mounted and rotatable with said second shaft, said compressor discharging into said combustion chamber, and said combustion chamber discharging into said turbine.

17. A gas turbine power plant as defined in claim 16 in which said contra-prerotation stage comprises two side-walls, and a plurality of cambered airfoil blades uniformly distributed around the inner peripheral surfaces of said side-walls, the opposed surfaces of said blades and the opposed surfaces of said side-walls defining a corresponding plurality of flow channels, said blades being cambered and shaped to form, within said flow channels, subsonic preacceleration portions at the entry, or input, side of said contra-prerotation stage followed by acceleration portions blending into supersonic acceleration portions at the exit, or output, side of said contra-prerotation stage.

18. A gas turbine power plant as defined in claim 16 in which said stationary contra-prerotation stage has a plurality of cambered blades defining flow channels, the inner ends of said blades forming supersonic nozzles.

19. A gas turbine power plant as defined in claim 16 in which said contra-prerotation stage has a plurality of cambered blades defining flow channels, said blades terminating in supersonic nozzles, whereby ambient air entering said prerotation stage emerges from said nozzles at an absolute supersonic velocity $C_1$ and at a supersonic relative velocity $W_1$, said velocity $W_1$ being relative with respect to the first compression stage mounted adjacent to said prerotation stage and when said first stage is rotated at its normal operating angular velocity, said first compression stage having a plurality of blades having wedge-shaped leading portions; the lagging, or the suction, surfaces of said wedge-shaped portions being parallel to the relative velocity $W_1$, and the leading, or the compression, surfaces of said wedge-shaped portions forming a sharp angle with velocity $W_1$, said velocity $W_1$ existing when said first compression stage is rotated at its normal, operating angular velocity.

20. A gas turbine power plant as defined in claim 19 in which the blades and the side-walls of said first compression stage are shaped, beyond the wedge-shaped leading portions, to produce turning flow channels having constant cross sectional area.

21. A gas turbine power plant as defined in claim 19 which also includes a second compression stage having a plurality of blades having wedge-shaped leading portions, the lagging, or the suction, surfaces of said portions being parallel to velocity $W_3$, and the leading, or compression, surfaces of said portions forming a sharp angle with velocity $W_3$, where $W_3$ is the relative velocity of the fluid entering said second compression stage, said relative velocity $W_3$ being with respect to said second stage when the latter is rotated at its normal, or operating, angular velocity.

22. A gas turbine power plant as defined in claim 21 in which the blades in the second stage are shaped, beyond the leading wedge-shaped portions, to produce diffusion channels.

23. A gas turbine power plant as defined in claim 16 which also includes a set of synchronizing gears interconnecting said first and second shafts.

24. A gas turbine power plant comprising a centripetal compressor having first and second contra-rotatable rotors, first and second set of compression stages mounted, respectively, on said rotors, a turbine having two contra-rotatable rotors, and first and second concentric shafts connected to the respective rotors of said turbine and said compressor for contra-rotating the rotors of said compressor through said shafts by means of the respective rotors of said turbine.

25. A gas turbine power plant as defined in claim 24 which also includes an axial duct within the inner shaft for conveying a portion of the compressor output through said duct to any consumer of said portion.

26. A gas turbine power plant comprising a centripetal compressor having two rotors, first and second concentric shafts supporting, respectively, said rotors, a turbine having at least one rotor mounted on said first shaft, a combustion chamber between said compressor and said turbine, said combustion chamber comprising a hollow toroid having a central aperture, with said first shaft passing through said aperture, said shaft including a fuel duct, an ignition cable, and an air duct connected to said compressor for cooling said first shaft, and said ignition cable.

27. A gas turbine power plant as defined in claim 26 in which said toroid is an integral part of said first shaft, whereby said toroid is rotatable with said first shaft.

28. A gas turbine power plant comprising a first hollow cylinder having two ends, first and second side-disks closing off the respective ends of said cylinder, a second hollow cylinder within said first cylinder, said second cylinder being concentric and coextensive with said first cylinder, third and fourth side-disks closing off the respective ends of said second cylinder, and compressor and turbine stages constituting an integral part of each of said cylinders.

29. A gas turbine power plant as defined in claim 28 in which said compression stages are mounted adjacent to one end of each cylinder, and said turbine stages are mounted adjacent to the opposite end of each cylinder.

30. A gas turbine power plant as defined in claim 28 which includes an elastic diaphragm between each sidedisk and the respective cylinder for permitting free radial expansion of the respective cylinders.

31. A gas turbine power plant as defined in claim 28 which also includes shaft means for contra-rotation of said cylinders.

32. A gas turbine power plant as defined in claim 28 which also includes a stationary vortex combustion chamber within said second cylinder.

33. A gas turbine power plant comprising first and second contrarotatable rotors, said first rotor comprising a single, mechanically integrated element having first and second centripetal flow compressor stages mechanically connected to a third centrifugal flow turbine stage, and said second rotor comprising a single mechanically integrated element having a third centripetal flow compressor stage mechanically connected to a first centrifugal flow turbine stage, all of said compressor and turbine stages being numbered in the direction of flow of a working fluid, said first rotor being mounted on a first shaft, and said second rotor being mounted on a second shaft, said shafts being concentric with respect to each other and having a common axis of rotation, said first shaft surrounding at least a portion of the second shaft.

34. A gas turbine power plant as defined in claim 33 which also includes a stationary, flow-turning stage between the first and second compressor stages, and a stationary, flow-turning stage between the second and third stages of said turbine.

35. A gas turbine power plant comprising first and second concentric shafts each having left, right and central portions, first and second rotors mounted, respectively, on said first and second shafts, said first and second rotors including centripetal flow compression stages mounted, respectively, on the left portions of the respective shafts and centrifugal flow turbine stages mounted respectively on the right portions of the respective shafts, a single combustion chamber fluid dynamically connecting said compression stages to said turbine stages, said chamber lying in a transverse plane centrally positioned between said compressor stages and said turbine stages and lying between two transverse planes defining the left and right ends of the central portions of said first and second shafts, an exhaust duct for conveying exhaust gases from said turbine stages into ambient air, an input air duct for conveying ambient air into said compression stages, and a duct system having its input ends in said input air duct, and its output ends in said exhaust duct, said output ends facing downstream with respect to said exhaust gases, whereby said output ends act as syphons for conveying a boundary layer of air formed along the walls of said input air duct into said exhaust duct prior to said boundary layer reaching said compression stages.

36. A gas turbine power plant as defined in claim 35 in which said single combustion chamber includes a fuel burning member and a plurality of duct means leading directly from said compressor stages to said turbine stages, said duct means being in parallel flow relationship with said fuel burning member.

References Cited in the file of this patent

UNITED STATES PATENTS

| | | |
|---|---|---|
| 1,748,979 | Gunderson | Mar. 4, 1930 |
| 2,218,957 | Möller | Oct. 22, 1940 |
| 2,357,778 | Beaven | Sept. 5, 1944 |
| 2,430,183 | Möller | Nov. 4, 1947 |
| 2,471,892 | Price | May 31, 1949 |
| 2,477,683 | Birmann | Aug. 2, 1949 |
| 2,514,874 | Kollsman | July 11, 1950 |
| 2,538,179 | Weinhardt | Jan. 16, 1951 |
| 2,576,046 | Scarth | Nov. 20, 1951 |
| 2,579,049 | Price | Dec. 18, 1951 |
| 2,599,470 | Meyer | June 3, 1952 |
| 2,600,302 | Kinsella | June 10, 1952 |
| 2,601,758 | Knopf | July 1, 1952 |